United States Patent [19]
Moser et al.

[11] 3,797,539
[45] Mar. 19, 1974

[54] PULPWOOD HARVESTER

[75] Inventors: Raymond L. Moser, Tremont; Dorrance Oldenburg, Peoria, both of Ill.

[73] Assignee: Caterpillar Tractor Co., Peoria, Ill.

[22] Filed: Sept. 30, 1971

[21] Appl. No.: 185,377

Related U.S. Application Data

[63] Continuation of Ser. No. 829,882, June 3, 1969, abandoned.

[52] U.S. Cl............................... 144/3 D, 144/2 Z
[51] Int. Cl............................................ A01g 23/08
[58] Field of Search ........ 144/2 Z, 3 D, 34 R, 34 E, 144/309 AC, 146 R, 208 R, 208 E; 214/147 R, 147 G

[56] References Cited
UNITED STATES PATENTS

| 2,821,220 | 1/1958 | Nicholson | 144/246 R |
|---|---|---|---|
| 2,899,993 | 8/1959 | Durant | 144/208 R |
| 3,074,446 | 1/1963 | Earl | 144/3 D |
| 3,348,592 | 10/1967 | Winblad et al. | 144/2 Z |
| 3,394,744 | 7/1968 | Vit | 144/3 D |
| 3,422,975 | 1/1969 | Crisp | 214/147 R |
| 3,461,928 | 8/1969 | Siiro | 144/3 D |
| 3,508,676 | 4/1970 | Peterson | 214/147 G |
| 3,527,272 | 9/1970 | Hamilton | 144/34 E |
| 3,542,099 | 11/1970 | Gibson | 144/3 D |
| 3,612,117 | 10/1971 | Kjell | 144/2 Z |
| 3,516,462 | 6/1970 | Martinson et al. | 144/3 D |
| 3,627,003 | 12/1971 | Kessler | 144/34 E |

*Primary Examiner*—Gerald A. Dost
*Attorney, Agent, or Firm*—Fryer, Tjensvold, Phillips & Lempio

[57] ABSTRACT

A pulpwood harvester mounted on a vehicle and comprising a set of delimbing blades, a set of rollers for moving a tree trunk past the delimbing blades, and a cut-off blade for severing the trunk near the ground.

19 Claims, 8 Drawing Figures

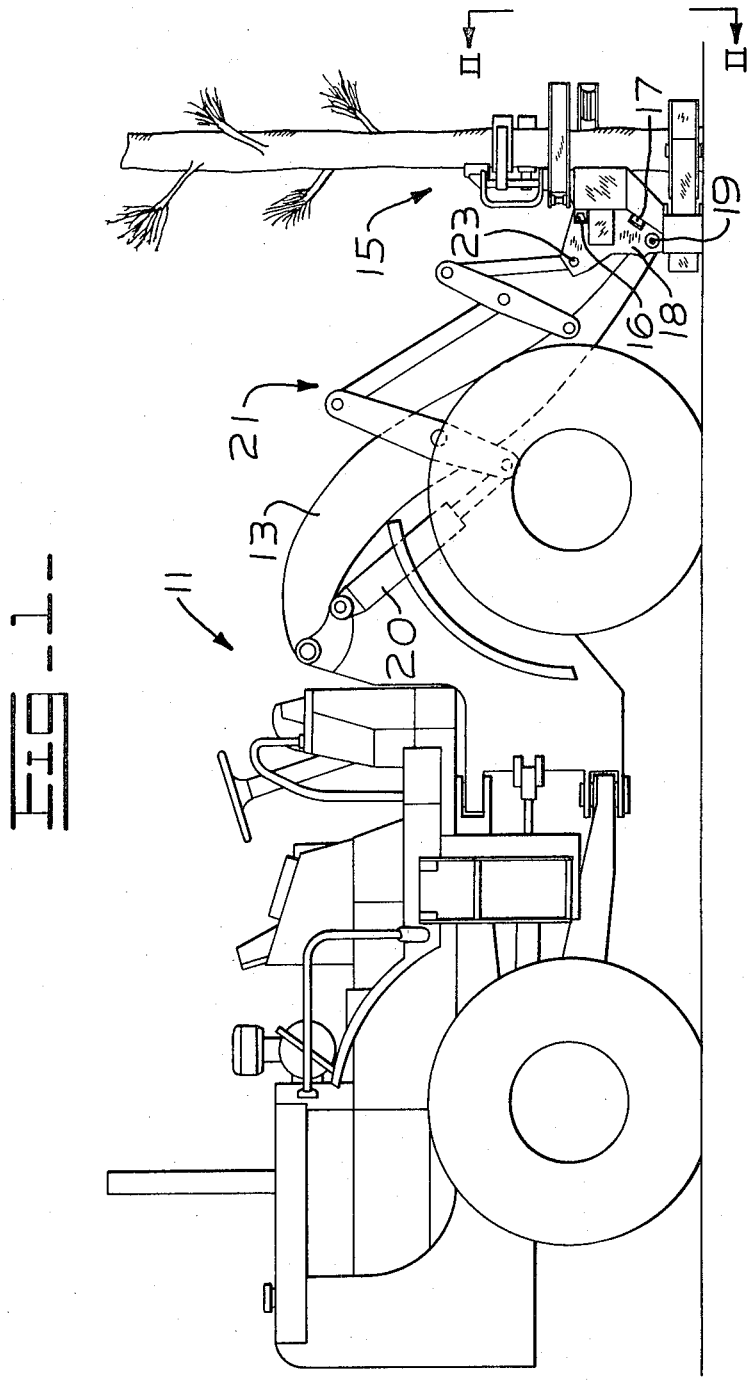

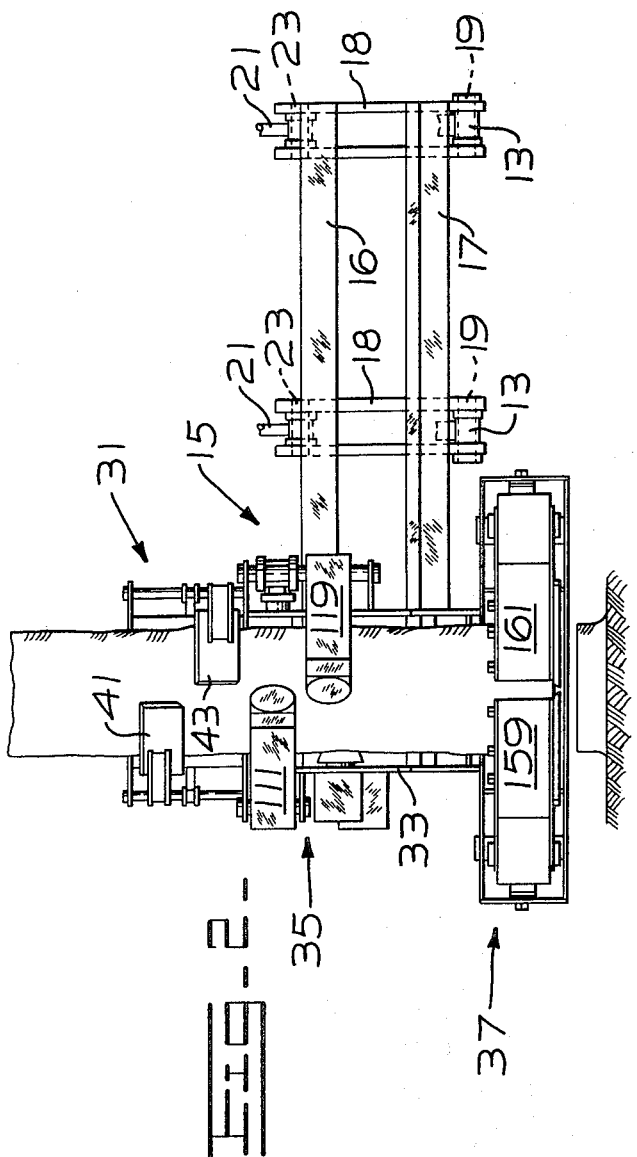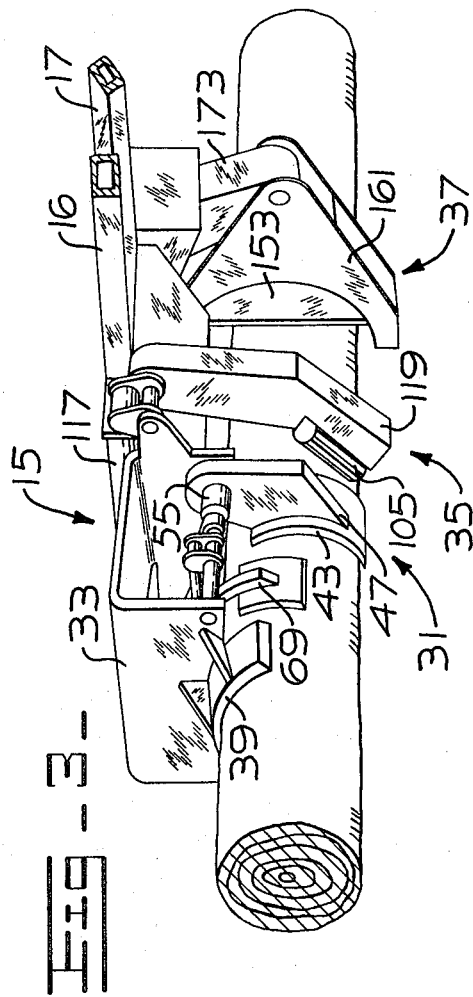

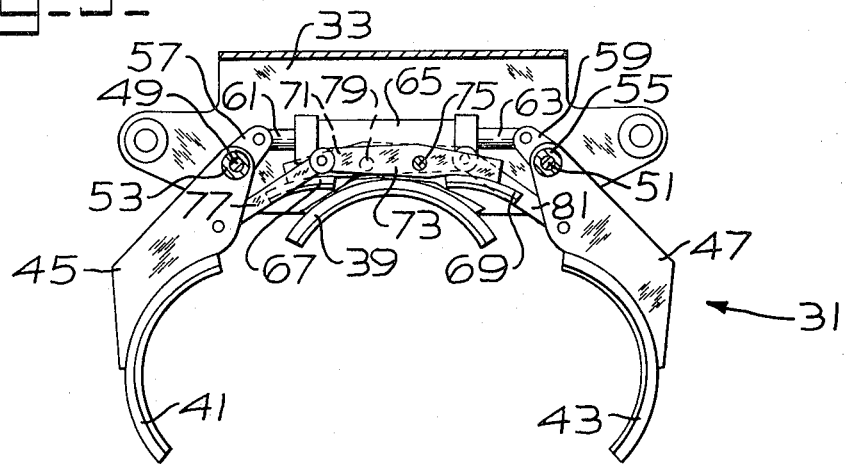
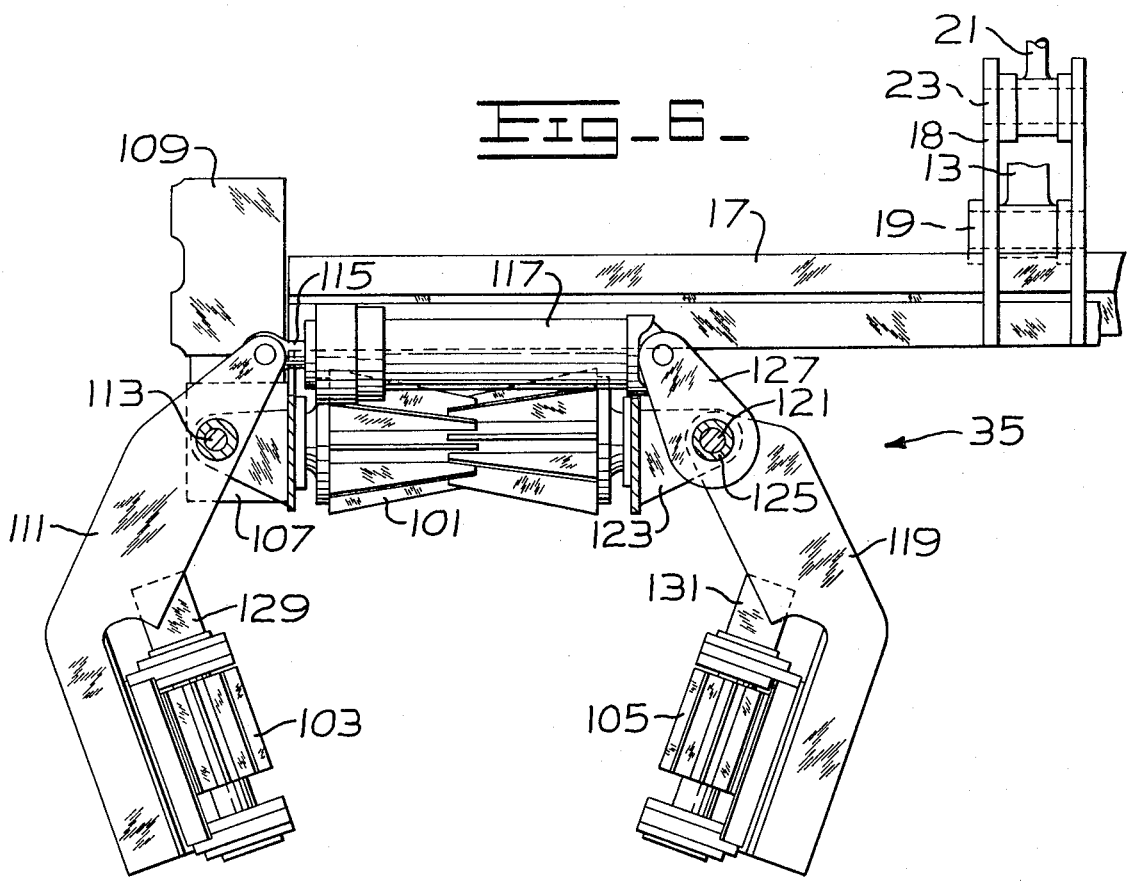

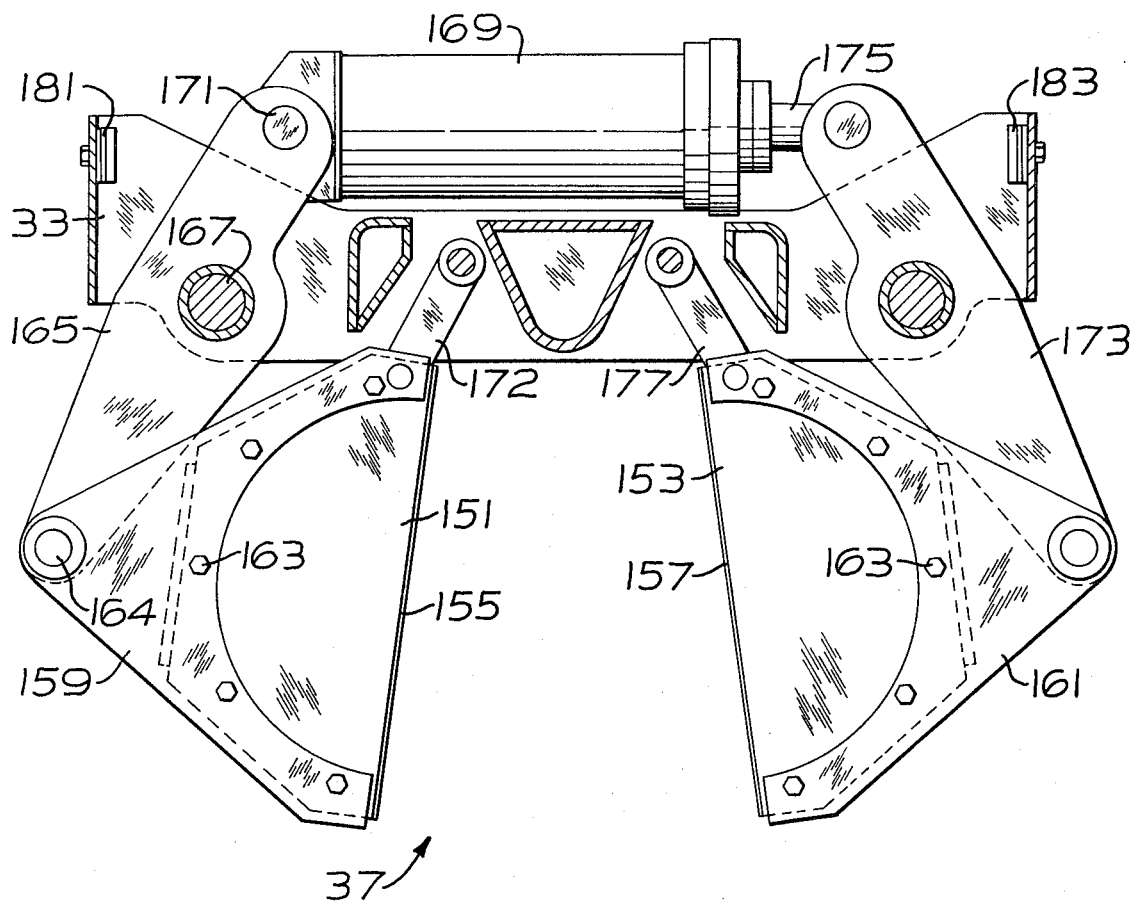

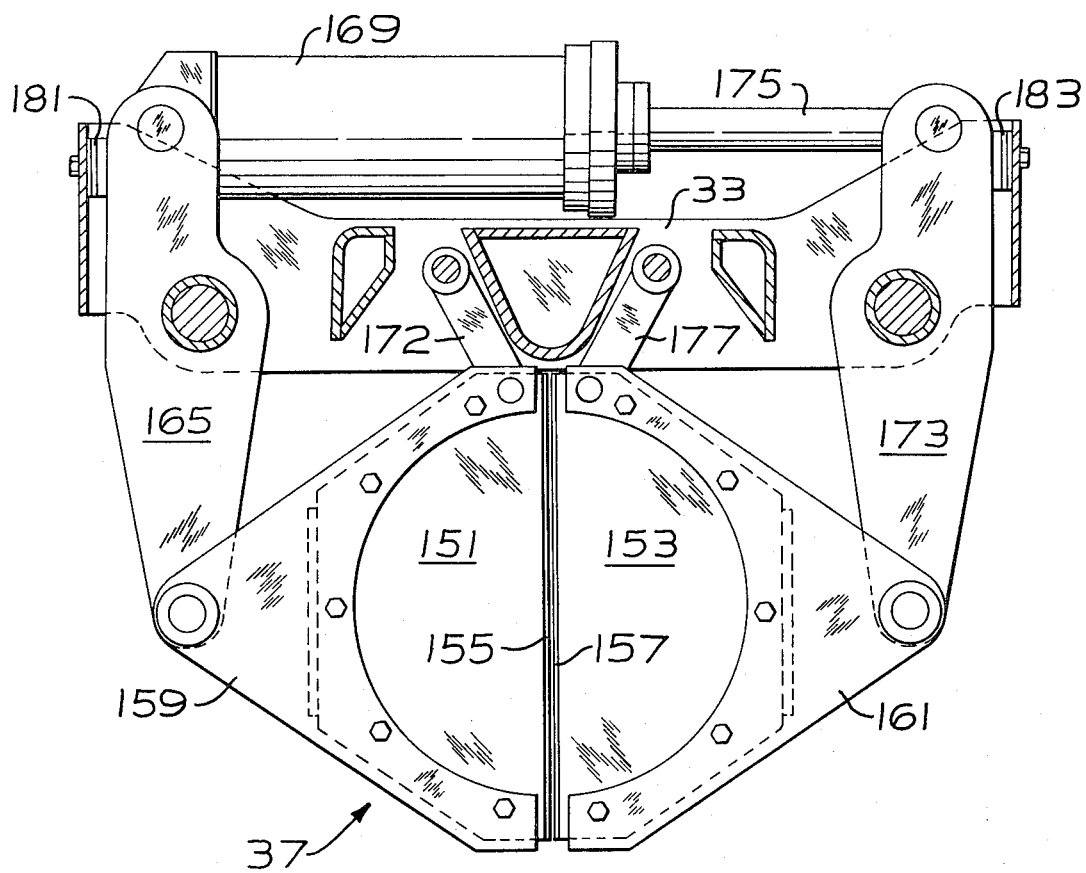

PULPWOOD HARVESTER

CROSS-REFERENCE TO RELATED APPLICATIONS

The present invention is a continuation of application Ser. No. 889,882, filed June 3, 1969 and entitled "Pulpwood Harvester," which application has now been abandoned.

BACKGROUND AND SUMMARY OF THE INVENTION

This invention relates to a pulpwood harvester with which a tree can be felled, delimbed, and cut to various lengths in one continuous operation.

In the field of pulpwood harvesting today, a majority of the work is done utilizing hand labor, resulting in increased costs and low production. Although mechanical pulpwood harvesters have been proposed, those available have proven to be relatively complicated and expensive, or else fail to perform the operations as satisfactorily as desired.

In the present invention therefore, a design has been produced which fulfills the requirements of providing a versatile, compact tree harvester unit which can be attached to either a wheel or track-type tractor and can be used in a variety of terrains and conditions.

Additionally, the harvester is a three function machine which fells a tree, removes the limbs, and cuts the tree into specified lengths.

A machine embodying the concepts of the present invention will also utilize a minimum of control hardware, thereby reducing its cost.

This invention, together with its further objects, advantages, modes, and embodiments, will become obvious to those skilled in the art by reference to the Detailed Description and accompanying drawings which illustrate what is presently considered to be the preferred embodiment of the best mode contemplated for utilizing the novel principles set forth in the claims.

BRIEF DESCRIPTION OF THE DRAWINGS

FIG. 1 is a side elevation of a vehicle upon which a pulpwood harvester embodying the concepts of the present invention is mounted;

FIG. 2 is a front elevation of the harvester, taken along a line II—II of FIG. 1, with the tree severed from its stump;

FIG. 3 is an isometric view of the harvester, illustating the tree and harvester as having been rotated from the vertical to a horizontal plane, for movement of the tree through the harvester;

FIG. 5 is a top view taken along a line V—V of FIG. 4;

FIG. 6 is a view taken along line VI—VI of FIG. 4;

FIG. 7 is a view taken along a line VII—VII of FIG. 4; and

FIG. 8 is a view similar to FIG. 7, showing the cut-off blades in the closed position.

DETAILED DESCRIPTION

Figure 4:
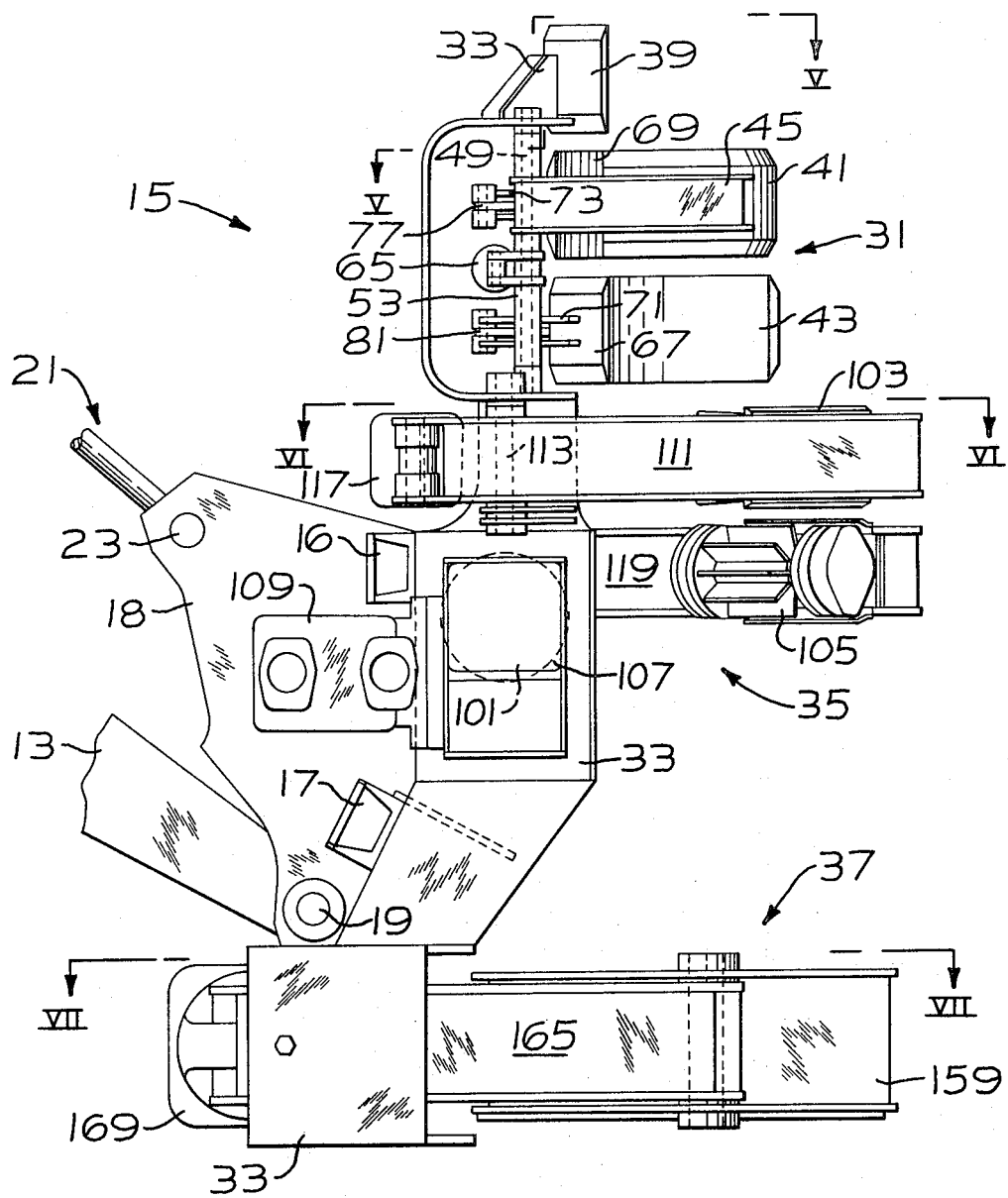
FIG. 4 is a side elevation of the harvester showing the details thereof.

As illustrated in FIG. 1, an end loader 11, having a pair of lift arms, one of which is shown at 13, carries a tree harvester 15 in an offset relationship, relative to a longitudinal axis of the machine. The harvester is offset to the side of the vehicle by a pair of structural members 16 and 17 which extend from the harvester 15 to brackets 18 also shown in FIG. 2. The brackets 18 are pivotally attached to the lift arms 13 at 19 and the harvester may be positioned, relative to the ground, by raising and lowering the arms 13 by a means of hydraulic cylinders (not shown). A pair of hydraulic cylinders, one of which is shown at 20, serve to actuate a linkage 21 which is attached to the brackets 18 at pivot point 23 so as to rotate the harvester and the tree from the vertical position illustrated in FIG. 2 to the horizontal position illustrated in FIG. 3 for a purpose to be described.

With reference now to FIGS. 4 and 5, a delimbing mechanism 31 is mounted on the upper portion of a frame 33 of the harvester 15. As shown in FIGS. 4 and 6, a drive roller mechanism 35 is mounted on the mid-portion of the frame 33, and as shown in FIGS. 4 and 7, a cut-off shear 37 is mounted at the lower end of the frame 33.

In operation, the vehicle 11 is driven to a position such that the harvester 15 can be positioned about a tree with the delimbing mechanism 31, the drive roller mechanism 35, and the cut-off shears 37 in the position illustrated in FIGS. 5, 6, and 7 respectively.

DELIMBER

The delimbing mechanism 31 comprises a blade 39 which is fixedly mounted on the upper portion of frame 33. A first set of vertically offset, movable blades 41 and 43 are mounted on arms 45 and 47 respectively. Arm 45 is pivotally secured to the harvester frame 33 at a pivot point 49, and arm 47 is similarly secured at a pivot point 51. Torque tubes 53 and 55 connect the arms 45 and 47 to a pair of levers 57 and 59 which, in turn, are pivotally secured to piston rods 61 and 63 which extend from the centrally located hydraulic jack 65. The cylinder 65 is supported by the levers 57 and 59 such that pressurization of the central portion of the cylinder causes piston rods 61 and 63 to act upon these lower levers and their respective torque tubes to pivot the arms 45 and 47 about their respective pivot points. Alternately, levers 57 and 59 could be pivotally secured to piston rod 63 and the opposite (head) end of hydraulic jack 65 respectively.

A second pair of movable blades 67 and 69 are mounted on a pair of arms 71 and 73 respectively. Arm 73 pivots about a pivot point 75 relative to the frame 33, and a pivot link 77 extending between the arm 73 and the arm 45 of the delimbing blade 41 serves to pivot the blade 69 in a clockwise direction about its pivot point 75 when the arm is pivoted in a counterclockwise direction about its pivot point 49. Similarly, arm 71 is pivoted relative to the frame about a point 79 and a pivoting link 81 serves to pivot the blade 67 in a counterclockwise direction when arm 47 pivots blade 43 in a clockwise direction.

Thus, when the harvester is placed adjacent the tree as described, blade 39 directly abuts the tree and cylinder 65 is pressurized so that blades 41 and 67 are moved in a counterclockwise direction against the tree and blades 43 and 69 are moved in a clockwise direction against the tree. The tree is thus clamped within the delimbing mechanism and, when the tree is later moved relative to the delimber in a manner to be described, a cutting edge on the upper surface of each of the five blades will serve to remove the limbs and branches from the tree.

DRIVE ROLLERS

Referring now to FIGS. 4 and 6, a drive roll mechanism 35 has been illustrated which also serves to clamp the tree within the harvester as well as to move the tree past the delimbing apparatus 31.

Referring now to those Figures in greater detail, it will be seen that the drive roll mechanism comprises three vertically offset rollers, 101, 103, and 105, having suitable exterior faces for gripping and moving a tree situated between the rollers.

The roller 101 is fixedly mounted to the frame 33 and is rotated, via a gear box 107, by a hydraulic motor 109.

Roller 103 is mounted on an arm 111 which is pivoted about a pivot point 113 by extension of a piston rod 115 from within a hydraulic cylinder 117.

The roller 105 is mounted for rotation on an arm 119 which pivots about a pivot point 121 situated on an extension 123 of the frame 33. A torsion tube 125 connects the arm 119 to a lever 127 which is pivotally attached to the head end of cylinder 117.

Thus, when the cylinder 117 is pressurized at the head end thereof, rod 115 will tend to move to the left and cylinder 117 will tend to move to the right, as viewed in FIG. 6, thereby causing roller 103 to pivot about point 113 in a counterclockwise direction and roller 105 to pivot about point 121 in a clockwise direction.

The rollers thus serve to clamp the tree within the harvester and, as will be described, roller 101 will act to draw the tree through the harvester. If desired, rollers 103 and 105 may also be driven by hydraulic motors 129 and 131 respectively.

SHEAR

Referring now to FIGS. 4 and 7, the shear 37 is shown to comprise a pair of flat, coplanar blades 151 and 153, having leading cutting edges 155 and 157 respectively. Blades 151 and 153 are removably mounted on arms 159 and 161 by suitable means such as bolts 163.

Arm 159 is pivotally attached at 164 to a lever 165 which is pivoted on the frame 33 at point 167. The opposite end of the lever is pivotally mounted to the head end of a cylinder 169 at point 171. Arm 159 is also attached to a lever 172 which is pivotally mounted between the arm and the frame 33.

Arm 161 is similarly attached to a pivotable lever 173 which is fixed to a piston rod 175 extending from cylinder 169. The arm 161 is also attached to a lever 177 which pivoted on the arm and the frame 33. When the head of the cylinder 169 is pressurized, the rod 175 tends to move to the right and the cylinder 169 tends to move to the left, as viewed in FIG. 7, thereby motivating the arms and blades to the position illustrated in FIG. 8. Removable shims 181 and 183 cooperate with the arms 165 and 173 to provide a positive stop so as to prevent the severing edges 155 and 157 from damaging each other.

In an alternate form the blades may be vertically offset relative to one another. This will allow the blades to be moved to a slightly overlapped position when severing the tree from its trunk, without creating any possibility of damage to the severing edges.

OPERATION

Thus, when the harvester is positioned about the tree as shown in FIG. 1, hydraulic cylinders 65, 117, and 169 are actuated in the manner described so that the delimber and the drive roll mechanism grip the tree and the shear severs it from its stump. The delimbers, drive roll mechanism, and the closed shear then serve to support the tree while the vehicle lift arms 13 are raised, as illustrated, to a small degree, in FIG. 2.

When the tree is elevated to a satisfactory distance, the hydraulic cylinders 20 are actuated so as to tilt the harvester from the position illustrated in FIG. 2 to that shown in FIG. 3. The rod end of hydraulic cylinder 169 is then actuated to separate the shear blades and hydraulic motors 109, 129, and 131 are actuated so as to cause the drive roll mechanism to move the tree trunk to the right, as illustrated in FIG. 3, allowing the delimber 31 to sever all branches from the tree as it passes. As the tree moves through the shear, the cylinder 169 may be actuated at predetermined times so that the trunk may be severed in convenient lengths.

Thus, the Applicants have provided a new and improved concept in the art of pulpwood harvesting, which yields a true advancement in the art. Many modifications and alterations will be obvious to those skilled in the art, wherefore what is claimed as the invention is:

We claim:
1. A delimbing mechanism comprising:
a frame,
a first blade fixed to the frame,
a second blade pivotally mounted on the frame,
a third blade pivotally mounted on the frame,
a fourth blade pivotally mounted on the frame,
a fifth blade pivotally mounted on the frame,
power means attached between the second and third blades for pivoting the blades relative to the frame so as to clamp a tree between the first, second and third blades,
means connecting the second blade to the fourth blade for simultaneous movement of those blades in opposite directions, and
means connecting the third blade to the fifth blade for simultaneous movement of those blades in opposite directions.
2. The delimbing mechanism of claim 1 including means on the frame for severing the tree from its stump and for cutting the tree into sections.
3. The delimbing mechanism of claim 1 including means on the frame for moving a tree past the blades for delimbing the tree.
4. The delimbing mechanism of claim 3 including means on the frame for severing the tree from its stump and for cutting the tree into sections after it passes through the delimbing blades.
5. A tree harvesting machine comprising:
an end loading type vehicle having pivotable lift arms and tilt means arranged at one end thereof,
a rigid support structure pivotally connected in transversely spaced apart relation to the respective lift arms and pivotally connected in transversely spaced apart relation to the tilt means at said end of the vehicle, the support structure extending transversely toward one side of the vehicle, said pivotal connections for the lift arms being offset from said pivotal connection for said tilt means, and an elongated frame rigidly attached to the supporting structure in transversely offset relation beyond one side of the vehicle, the frame including a shear mechanism arranged at one end thereof, a delimbing mechanism being arranged toward the other end of the frame and a drive and clamping mechanism being arranged on the frame between the shear and delimbing mechanisms, the lift arms being pivotable to raise and lower the rigidly interconnected support structure and elongated frame, the tilt means being operable to rotate the support structure by its pivotable connection with the lift arms and thereby shift the rigidly interconnected elongated frame including said shear and delimbing mechanisms between a generally vertical position with the shear mechanism arranged at the lower end thereof to receive a standing tree and a generally horizontal position for processing the tree.

6. A tree harvester according to claim 5, additionally including drive roll means for moving a tree through said harvester comprising:
a frame,
a first roller fixed on the frame for rotation about its axis,
a second roller pivotally mounted on the frame and rotatable about its axis,
a third roller pivotally mounted on the frame and rotatable about its axis, and
power means suspended between the second and third roller for pivoting those rollers so as to clamp a tree between the first, second, and third rollers.

7. The drive roll mechanism of claim 5 including means mounted on the frame for powering the first roller for rotation about its axis.

8. The drive mechanism of claim 6 including means fixed to at least one of the first, second, or third rollers for powering the at least one roller about its axis.

9. The drive roll mechanism of claim 8 including means on the frame for delimbing the trunk of the tree as it is driven through the mechanism by the rollers.

10. The drive roll mechanism of claim 9 including means on the frame for severing the tree from its stump and for cutting the tree into sections as it passes through the mechanism.

11. The drive roll mechanism of claim 6 including means on the frame for severing the tree from its stump and for cutting the tree into sections as it passes through the mechanism.

12. The tree harvester of claim 5 wherein the clamping and drive mechanism include means for clamping a standing tree with the frame in its vertical position while the tree is severed by the shear mechanism and means for moving the severed tree past the delimbing mechanism for removing limbs from the tree.

13. The tree harvester of claim 5 wherein the support structure comprises bracket means pivotally connected to the tilt means above the pivotal connection between the support structure and the lift arms.

14. The tree harvester of claim 5 wherein the delimbing mechanism comprises blade means movable between a position to receive the tree and a position in clamped engagement about the tree, the drive and clamping mechanism comprising drive means fixedly mounted to a midportion of the elongated frame for rotatable engagement with the tree and clamping arms pivotally coupled to the frame for movement between a position to receive the tree and a position to clamp the tree in engagement with the drive means.

15. A tree harvesting machine comprising
a frame,
a delimber mounted on the frame and comprising
a first blade fixed to the frame,
a second blade, and
a third blade, each pivotally mounted on the frame for horizontal movement relative thereto,
a fourth blade pivotally mounted on the frame,
a fifth blade pivotally mounted on the frame,
means connecting the second and fourth blades for simultaneous movement thereof in opposite directions, and
means connecting the third and fifth blades for simultaneous movement thereof in opposite directions,
a drive roll mechanism mounted on the frame and comprising
a first roller fixed on the frame for rotation about its axis,
a second roller,
a third roller, and
means mounting the second and third rollers on the frame for pivotal movement relative thereto, and
a shear mounted on the frame and comprising
a pair of flat, coplanar blades, and
means mounting the blades for pivotal movement relative to the frame.

16. The tree harvesting machine of claim 15 wherein the drive roll mechanism further comprises
power means suspended between the second and third roller pivotal mounting means for pivoting those rollers so as to clamp a tree between the first, second and third rollers.

17. The tree harvesting machine of claim 16 wherein the drive roll mechanism further includes
means fixed to at least one of the first, second, or third rollers for powering at least one of the first, second, or third rollers for powering at least one roller about its axis.

18. The tree harvesting machine of claim 16 wherein the shear further comprises
a cutting edge on each blade, and
power means suspended between the blade mounting means for pivoting the blades to and from a position wherein the cutting edges are in abutting relationship.

19. A tree harvesting machine comprising:
an end loading type vehicle having pivotable lift arms and tilt means arranged at one end thereof,
a rigid support structure pivotally connected in transversely spaced apart relation to the respective lift arms and pivotally connected in transversely spaced apart relation to the tilt means at said end of the vehicle, the support structure extending transversely toward one side of the vehicle, said pivotal connections for the lift arms being offset from said pivotal connection for said tilt means, and
an elongated frame rigidly attached to the supporting structure in transversely offset relation beyond one side of the vehicle, the frame including a cut-off mechanism arranged at one end thereof, a delimbing mechanism being arranged toward the other end of the frame and a drive and clamping mechanism being arranged on the frame between the cut-off and delimbing mechanisms, the lift arms being pivotable to raise and lower the rigidly interconnected support structure and elongated frame, the tilt means being operable to rotate the support structure by its pivotable connection with the lift arms and thereby shift the rigidly interconnected elongated frame including said cut-off and delimbing mechanisms between a generally vertical position with the cut-off mechanism arranged at the lower end thereof to receive a standing tree and a generally horizontal position for processing the tree.

* * * * *